(12) United States Patent
Dyer et al.

(10) Patent No.: US 12,104,646 B2
(45) Date of Patent: Oct. 1, 2024

(54) SNAP FEATURE ASSEMBLY AND METHOD

(71) Applicant: Schaeffler Technologies AG & Co. KG, Herzogenaurach (DE)

(72) Inventors: Andrew Dyer, Charlotte, NC (US); Roland Schwarz, Allersberg (DE); Scott Hart, Sharon, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 275 days.

(21) Appl. No.: 17/574,021

(22) Filed: Jan. 12, 2022

(65) Prior Publication Data
US 2023/0220876 A1    Jul. 13, 2023

(51) Int. Cl.
| | |
|---|---|
| *F16C 33/46* | (2006.01) |
| *F16C 19/50* | (2006.01) |
| *F16C 33/38* | (2006.01) |
| *F16C 43/04* | (2006.01) |

(52) U.S. Cl.
CPC ........ *F16C 33/4605* (2013.01); *F16C 19/502* (2013.01); *F16C 33/3806* (2013.01); *F16C 43/04* (2013.01); *F16C 2226/74* (2013.01)

(58) Field of Classification Search
CPC ............... F16C 19/502; F16C 33/3806; F16C 33/4605; F16C 43/04; F16C 2226/74; Y10T 24/4555; Y10T 24/45529; Y10T 292/0911; Y10T 403/1624; Y10T 403/1616; F16B 5/0064; F16B 21/06; F16B 21/086; H05K 7/12; H05K 5/0013
See application file for complete search history.

(56) References Cited

U.S. PATENT DOCUMENTS

| | | | | |
|---|---|---|---|---|
| 4,635,809 A | * | 1/1987 | Bachman | ................. F16B 5/00 |
| | | | | 312/7.1 |
| 5,352,047 A | * | 10/1994 | Ingall | ...................... F16C 43/04 |
| | | | | 384/526 |
| 2009/0028480 A1 | | 1/2009 | Krause et al. | |
| 2010/0054648 A1 | * | 3/2010 | Oishi | .................... F16C 19/502 |
| | | | | 384/548 |
| 2010/0187051 A1 | * | 7/2010 | Katayama | ............. F16C 33/588 |
| | | | | 188/151 R |
| 2011/0007994 A1 | * | 1/2011 | Vornehm | ............... F16C 19/502 |
| | | | | 384/572 |
| 2012/0016739 A1 | | 7/2012 | Werner | |
| 2015/0285307 A1 | * | 10/2015 | Mola | ..................... F16C 33/605 |
| | | | | 384/473 |

FOREIGN PATENT DOCUMENTS

| | | |
|---|---|---|
| CN | 2348222 Y | 11/1999 |
| CN | 111222207 A | 6/2020 |
| KR | 10-1786933 B1 | 10/2017 |
| KR | 10-2019-0115374 A | 10/2019 |
| WO | 2016059549 A2 | 4/2016 |

* cited by examiner

*Primary Examiner* — Alan B Waits
(74) *Attorney, Agent, or Firm* — Volpe Koenig (57) ABSTRACT

A multi-component snap assembly is disclosed herein in which a snap flange has a snap nose with a contact face including a relief. The relief is configured to prevent undesirably high stress in the snap flange during assembly with another component that includes a retention pocket. A method of attaching or connecting two components with each other using a snap flange with a relief is also disclosed herein.

15 Claims, 12 Drawing Sheets

SNAP FEATURE ASSEMBLY AND METHOD

FIELD OF INVENTION

The present disclosure relates to a snap feature for assembling two parts with each other.

BACKGROUND

Snap-type assemblies or features are well known. Various types of snapping attachment between two components generally require a tab or flange on a first part, and a pocket or recess on a second part. During attachment, one part is generally pressed or inserted relative to the other part. This attachment step or assembly step generally causes a temporary and slight deformation of the tab or pocket to achieve snapping engagement between the two parts.

There is a general desire to provide sufficient overlap between the tab and the pocket of these parts to ensure there is sufficient attachment. However, providing an overly large overlap can cause the parts to plastically deform, fracture, crack, or otherwise become damaged during assembly. This is particularly an issue for the neck of any snapping flange or tab, which generally experiences the highest amount of stress in these configurations.

It would be desirable to provide a snapping attachment configuration that avoids high concentrations of stress in the snapping features but also provides the requisite level of overlap to ensure a secure connection between the mating components.

SUMMARY

An improved snap feature assembly and method is generally disclosed herein. In one aspect, a multi-component snap assembly includes a first component including a snap flange. The snap flange includes a snap nose having a contact face with a relief. A second component includes a retention pocket configured to gradually engage with the contact face during insertion of the second component relative to the first component. The second component is generally formed from a more rigid material than the first component. The first component can be a bearing cage, and the second component can be a bearing ring, in one embodiment.

At least three distinct contact points (A, B, C) are defined between the snap nose and the retention pocket during insertion of the second component relative to the first component due to the relief on the contact face. A first contact point (A) can be defined on a radially outer region of the snap flange, a second contact point (B) can be defined on a radially inner region of the snap flange, and a third contact point (C) can be defined circumferentially away from the first and second contact points (A, B). During insertion or assembly, the second component can be pressed in a predominantly radially inward direction for engagement with the first component.

The relief on the snap nose can define an asymmetrical profile for the contact face. The relief can have a parabolic profile that extends in a circumferential direction, in one aspect. The relief can have a circumferential extent that is at least 50% of a total circumferential extent of the snap flange. In another embodiment, the relief can have a circumferential extent that is less than 50% of a total circumferential extent of the snap flange. The face of the relief can be flat or curved.

The relief preferably extends from a first circumferential end of the snap flange. A secondary relief can be defined on a second, opposite circumferential end of the snap flange.

A method of attaching a first component with a second component via a snapping arrangement is also disclosed herein. The method comprises providing a first component including a snap flange that defines a snap nose having a contact face with a relief. The method also includes providing a second component including a retention pocket. The method includes pressing the second component relative to the first component such that the contact face engages the retention pocket, and the first and second components are attached to each other.

In one aspect, the relief at the snap nose can alter contact between the snap nose and the flange during assembly to provide wider contact and a less stress inducing mounting procedure.

A relief can also be made at the flange-contact-area to enlarge the contact during mounting between the snap nose and the flange for a similar reduction in stress during the mounting procedure.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly. The circumferential direction (CD) is illustrated in FIG. 4E, and the radial direction (R) is also illustrated in FIG. 4E.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
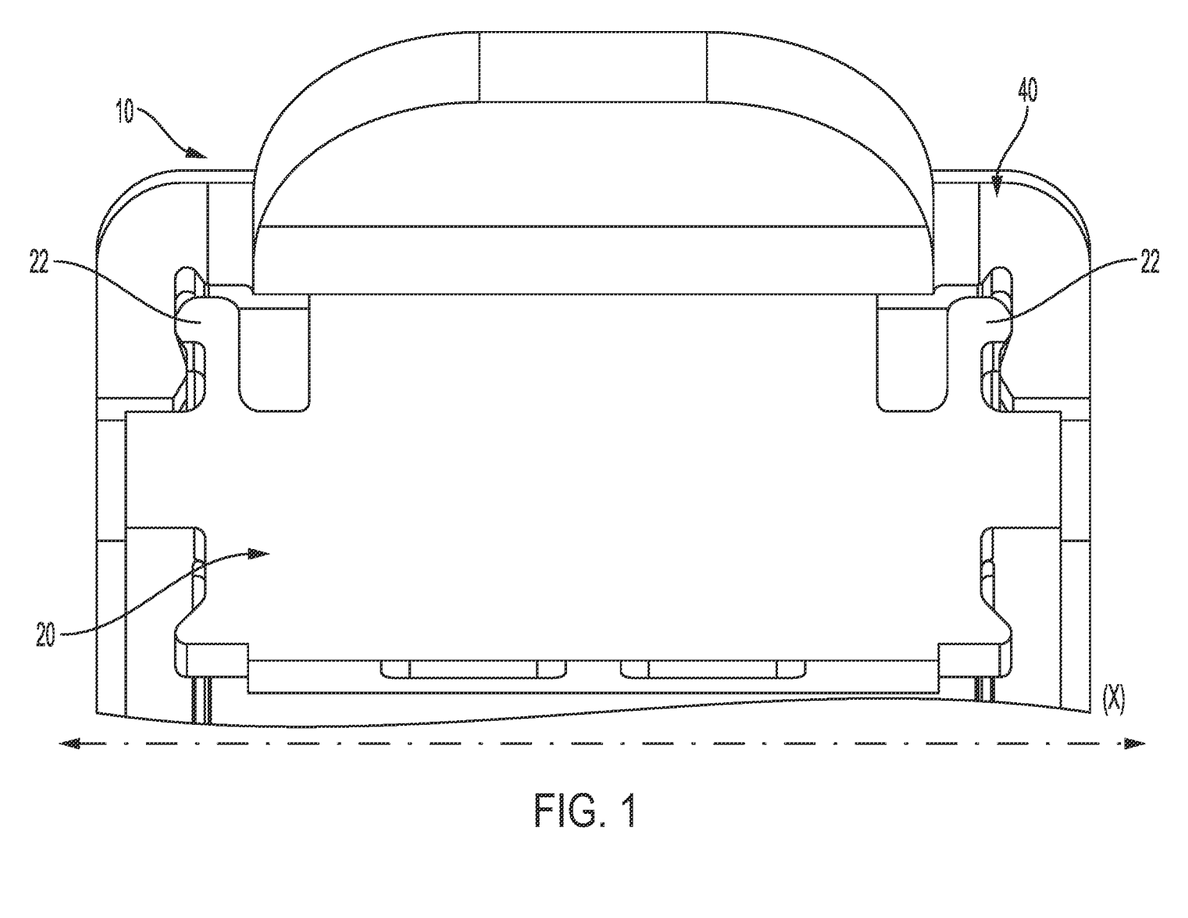
FIG. 1 illustrates a cross-sectional view of a bearing assembly.
Figure 2:
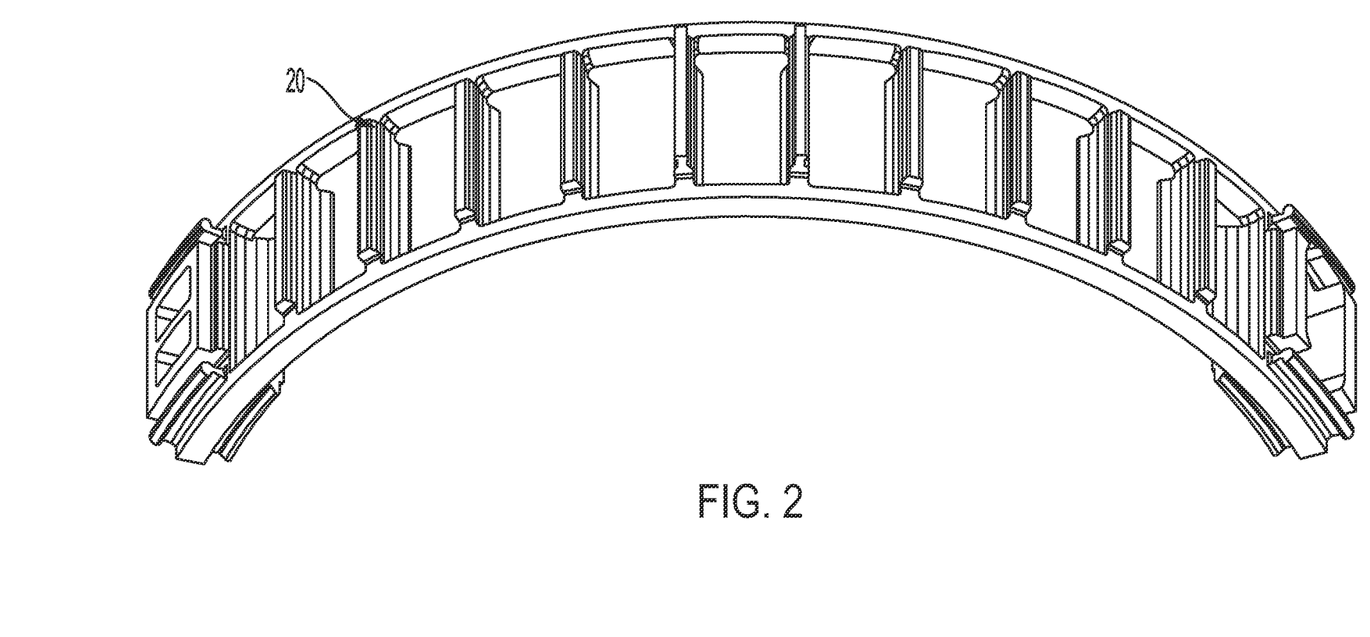
FIG. 2 is a perspective view of a cage for the bearing assembly.
Figure 3A:
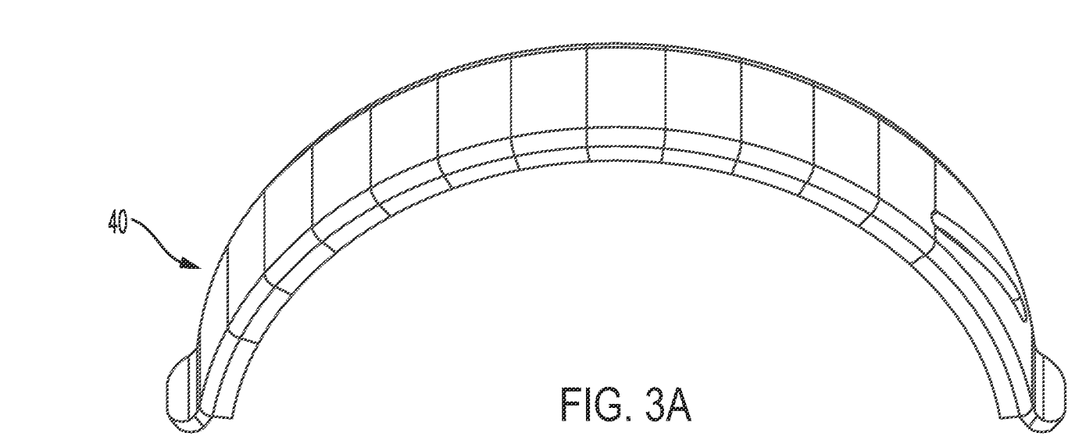
FIGS. 3A and 3B are perspective views of a bearing ring for the bearing assembly.
Figure 3B:
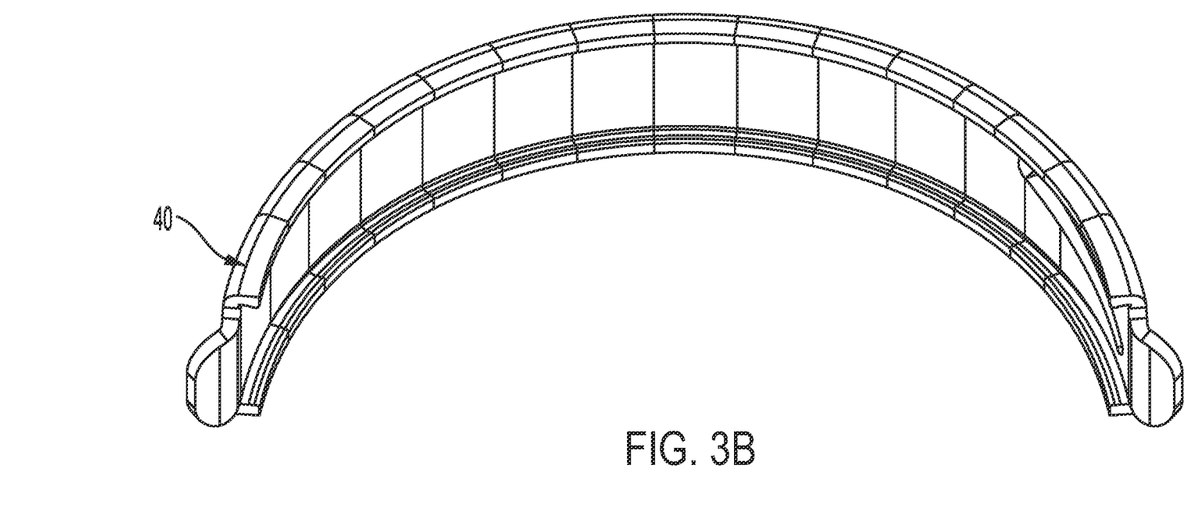

As shown in FIG. 1, an assembly 10 is disclosed herein in which a first component 20, such as a cage, is attached to a second component 40, such as an outer bearing ring. One of ordinary skill in the art would understand that the configuration disclosed herein can be used for other assemblies that are not directed to bearing assemblies. The cage 20 is shown in FIG. 2 and the bearing ring 40 is shown in FIGS. 3A and 3B.

In one aspect, assembly 10 is a multi-component snap assembly. The first component 20 generally includes a first snap feature, such as snap flange, that has a modified geometry or profile that specifically reduces stresses caused in a base or neck of the snap flange during assembly. The second component 40 includes a second snap feature, such as a retention pocket, that is configured to gradually engage with the first snap feature during insertion of the second component relative to the first component. The first and second components can be formed from different materials, in one aspect. Based on the modified geometry of the snap flange, there are at least three distinct points of contact between the snap features during assembly or insertion.

In one aspect, a snap feature or mating connection is generally provided to attach the cage 20 with the bearing ring 40. During installation, the cage 20 can be secured on a shaft (not shown). The bearing ring 40 is then pressed, preferably in a downward or predominantly radially inward direction, relative to the cage 20. One of ordinary skill in the art would understand that some combination of a minimal amount of axial movement and primarily radial movement can be used during this step. As used in this context, the term predominantly radially inward direction means the primary movement is in this direction, but some axial movement is possible. This gradual installation process temporarily bends a retention or snap feature relative to another retention or snap feature. Depending on the geometry or profile of the retention features, this process can cause undesirably high stress to a region of the retention features, thereby possibly causing fracturing of one of the components or regions.

Although the Figures provided herein generally disclose a male type retention feature on the cage 20 and a female type retention feature on the bearing ring 40, one of ordinary skill in the art would understand that this configuration may be reversed. Additionally, although the Figures illustrate a retention feature on an outer ring, one of ordinary skill in the art would understand that the retention feature could be formed on the inner bearing ring in alternative arrangements.

As shown in FIGS. 4A-4F, a retention or snap feature on the cage 20 can comprise at least one snap flange 22 connected to a base of the cage 20 via a neck 21 (i.e. beam body). The cage 20 can include more than one snap flange 22. For example, a pair of snap flanges 22 can be provided on opposite axial sides of the cage 20, as shown in FIG. 1. Additionally, multiple snap flanges 22 can be arranged circumferentially spaced from each other, as shown in FIG. 2.

The snap flange 22 generally includes a snap nose 24 that defines a contact face 24a configured for engagement with the bearing ring 40. The snap flange 22 can generally comprise various regions or areas. For example, the snap flange 22 can include a top round region 26, a transition region 28, and a retention face region 30. These regions are shown in detail in FIG. 4C. The top round region 26 generally defines a region adjacent to a tip 27 of the snap flange 22. The top round region 26 can generally include a curved profile, in one aspect. The top round region 26 can have a continuous curvature for its entirety, in one aspect. One of ordinary skill in the art would understand that the profile of the top round region 26 can vary.

The transition region 28 defines a connection between the top round region 26 and the retention face region 30. The transition region 28 can define an angled or slanted profile, in one aspect. One of ordinary skill in the art would understand that the profile of the transition region 28 can vary.

The retention face region 30 can generally include a flat profile, in one aspect. The neck 21 is connected to the retention face region 30 either directly or via a secondary transition region or area. One of ordinary skill in the art would understand that the profile of the retention face region 30 can vary.

In one aspect, the contact face 24a has an asymmetrical profile. In other words, the contact face 24a has a varying profile that is not identical between axial ends of the snap flange 22. The contact face 24a can include a profile that is non-uniform in a circumferential direction. More specifically, the contact face 24a can include a relief 32. The relief 32 can have a generally U-shaped or parabolic shape that is oriented in a sideways direction (i.e. circumferential direction), as best shown in FIGS. 4E and 4F. In one aspect, a circumferential length of the relief 32 can be at least 50% of a circumferential extent of the snap flange 22. In another aspect, a circumferential length of the relief 32 is less than 50% of a circumferential extent of the snap flange 22.

In one aspect, the relief 32 can be defined on at least the top round region 26 and the transition region 28. The relief 32 can be defined on areas of the snap flange 22 away from the retention face region 30, in one aspect. In another aspect, the relief 32 can be defined on the retention face region 30. The exact shape of the relief 32 can be modified. For example, the relief 32 have a profile of single or multiple linear point-to-point relief or reliefs that are connected or chained together, or some combination of a geometric shape with a variable or constant geometric sweep through the snap flange 22.

The relief 32 is arranged on a first circumferential end of the snap flange 22, in one aspect. The relief 32 can be considered an entry relief that corresponds to the first area of engagement between the snap flange 22 and the retention pocket 42. Another relief 33 can be defined on a second circumferential end of the snap flange 22. In one aspect, the relief 33 is considered an exit relief. The reliefs 32, 33 can generally include a chamfered, i.e. tapered or ramped, surface. In one aspect, the relief 32 has a greater depth at a first circumferential end (i.e. an end of the snap flange 22) as compared to a second circumferential end (i.e. in a medial region of the snap flange 22). In other words, the relief 32 can be sloped upwards in a direction from the circumferential end of the snap flange 22 to a medial circumferential region of the snap flange 22. In one aspect, an angle of the chamfered or ramped surface of the relief is less than 5 degrees, and more particularly less than 2 degrees. In one aspect, the angle of the chamfered or ramped surface of the relief is less than 1.9 degrees.

In one aspect, the relief 32 is provided in order to spread out contact between the snap flange 22 and the retention pocket 42 to a relatively large area. The relief 32 dimensions, shape, profile, etc., can vary depending on the specific application. For example, if a particular bearing is larger or smaller, then the characteristics of the relief may vary. If the materials used to form the first or second mating or snapping components varies, then the relief characteristics may also vary.

Based on the profile of the relief 32, three distinct contact regions or points are established on the snap flange 22 during assembly with the bearing ring 40. These three distinct contact points are shown as points (A, B, C) in FIG. 4E. In one aspect, at least three distinct contact points are provided. One of ordinary skill in the art would understand that additional or fewer contact points can be provided. As shown in FIG. 4E, a first contact point (A) is defined at an outer region or tip of the snap flange 22. The first contact point A is provided at an upper portion of the relief 32 (i.e. a radially outer portion of the relief 32). A second contact point (B) is defined inward from the first contact point (A). The second contact point (B) is generally defined on an opposite side of the relief 32 (i.e. a radially inward portion of the relief 32) from the first contact point (A). As the bearing ring 40 is continued to pushed downward, the third contact point (C) is provided at a circumferential end of the relief 32. In one aspect, the first and second contact points (A, B) are aligned with each other in a radial direction.

The configuration of the relief 32 essentially spreads out contact between the snap flange 22 and the retention pocket 42. The shape of the relief 32 ensures more uniform engagement between the snap flange 22 and the retention pocket 42.

Figure 4A:
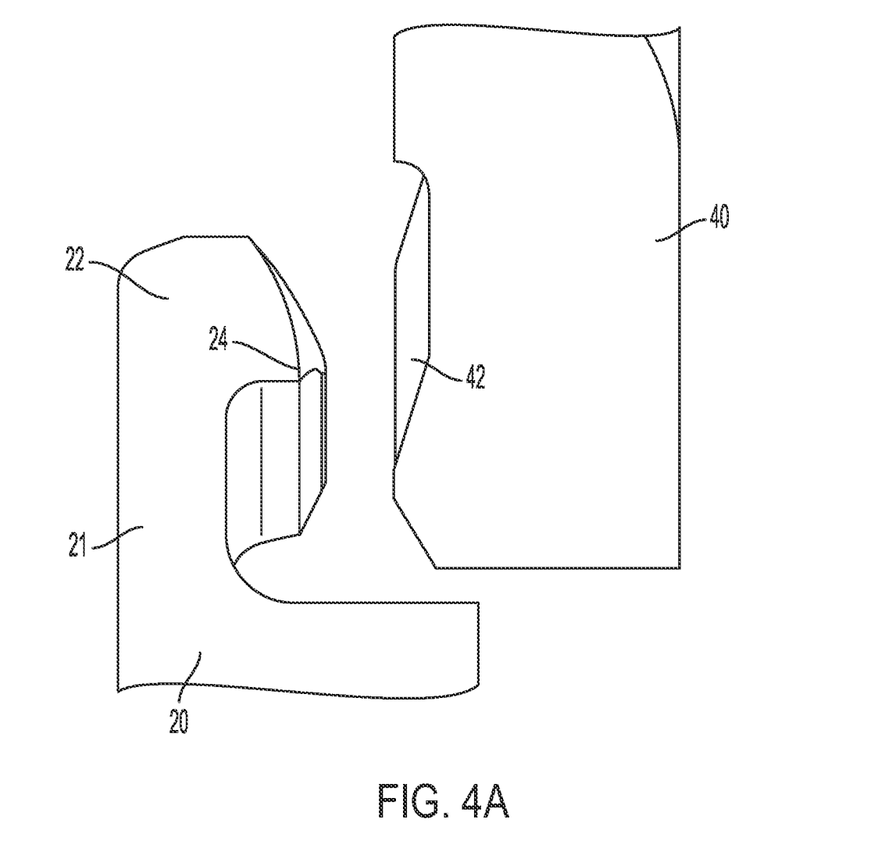
FIG. 4A is a side view of the cage and bearing ring prior to engagement.
Figure 4B:
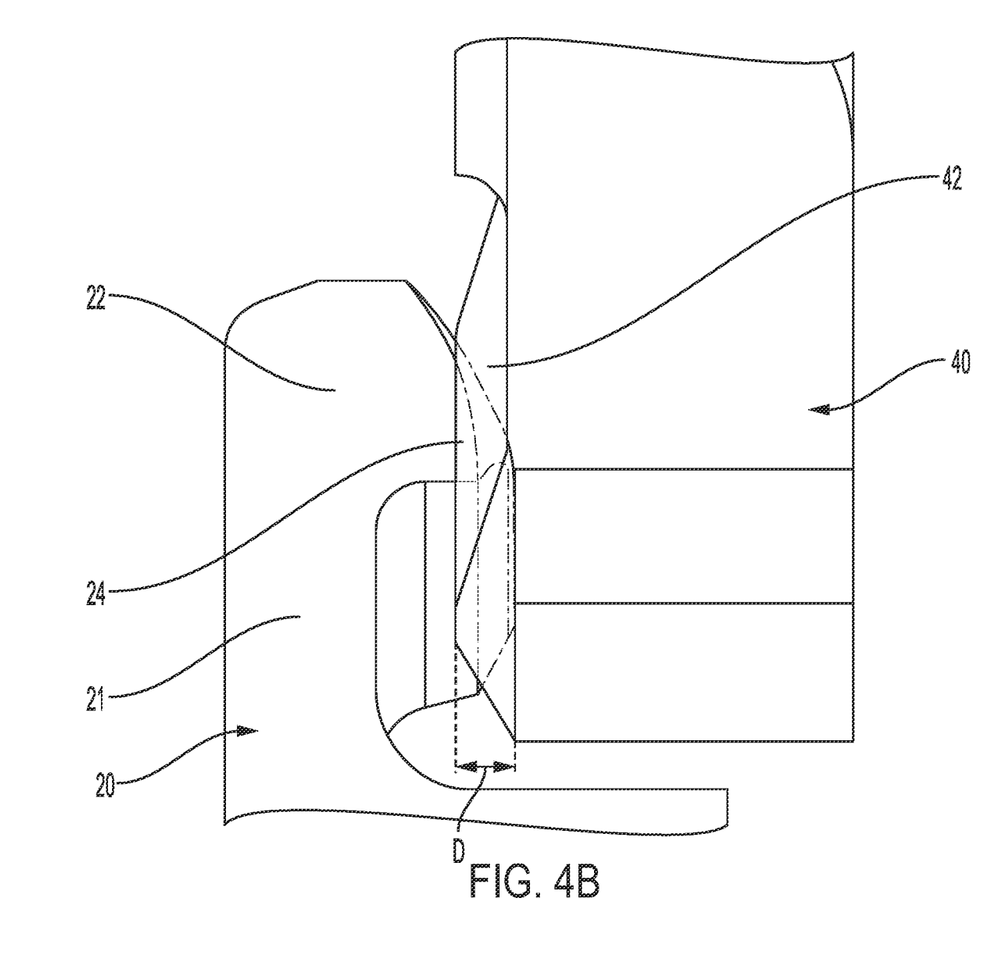
FIG. 4B is a side view of an interface between a retention pocket and a snap flange.
Figure 4C:
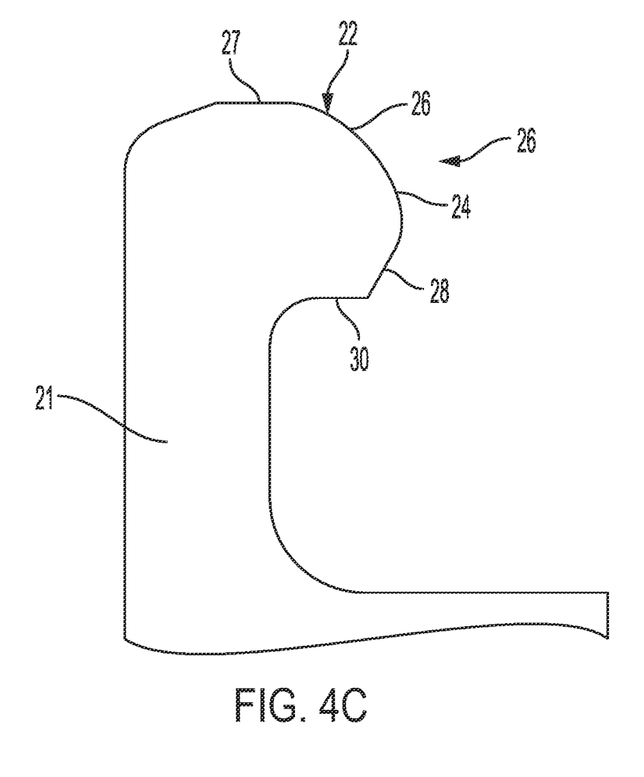
FIG. 4C is a magnified view of the snap flange of FIGS. 4A and 4B.
Figure 4D:
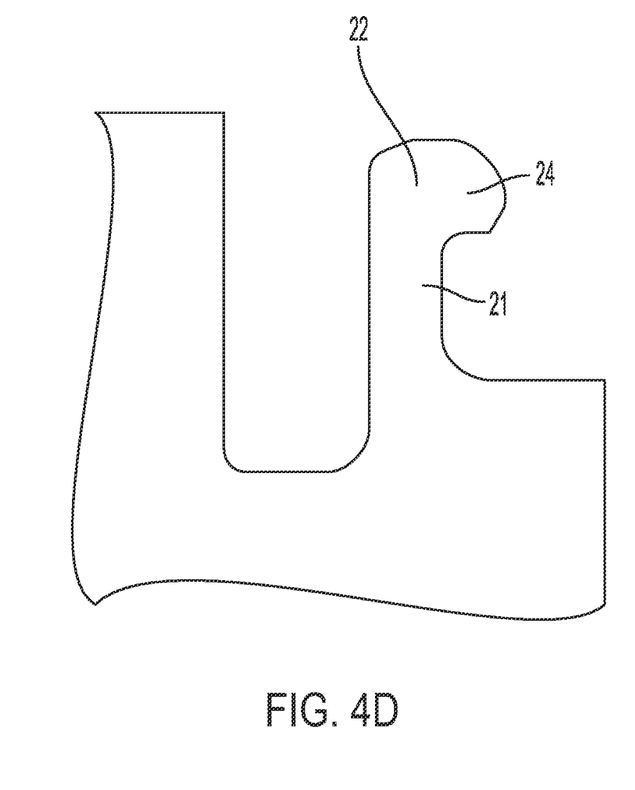
FIG. 4D is another magnified view of the snap flange of FIGS. 4A-4C.
Figure 4E:
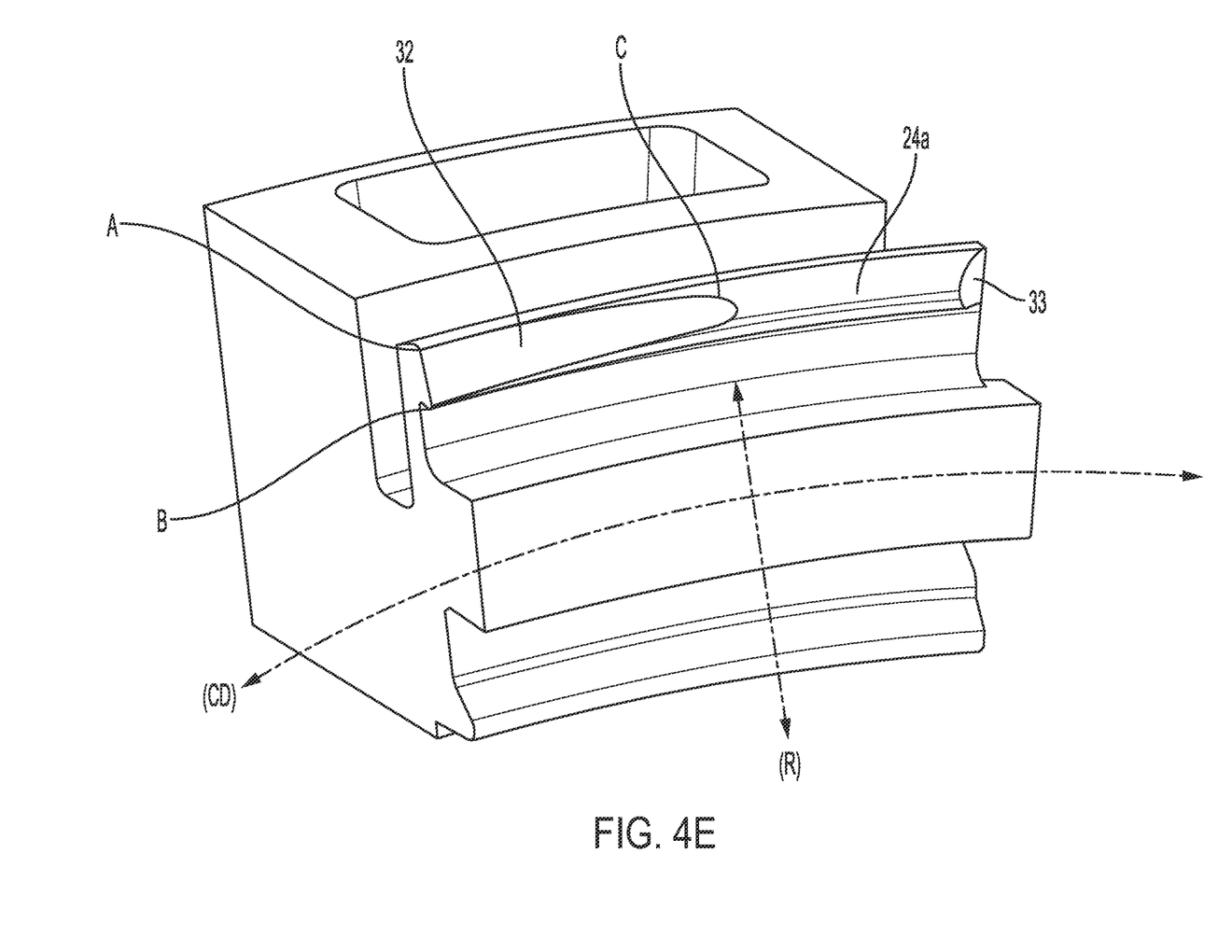
FIG. 4E is a front perspective view of the snap flange of FIGS. 4A-4D.
Figure 4F:
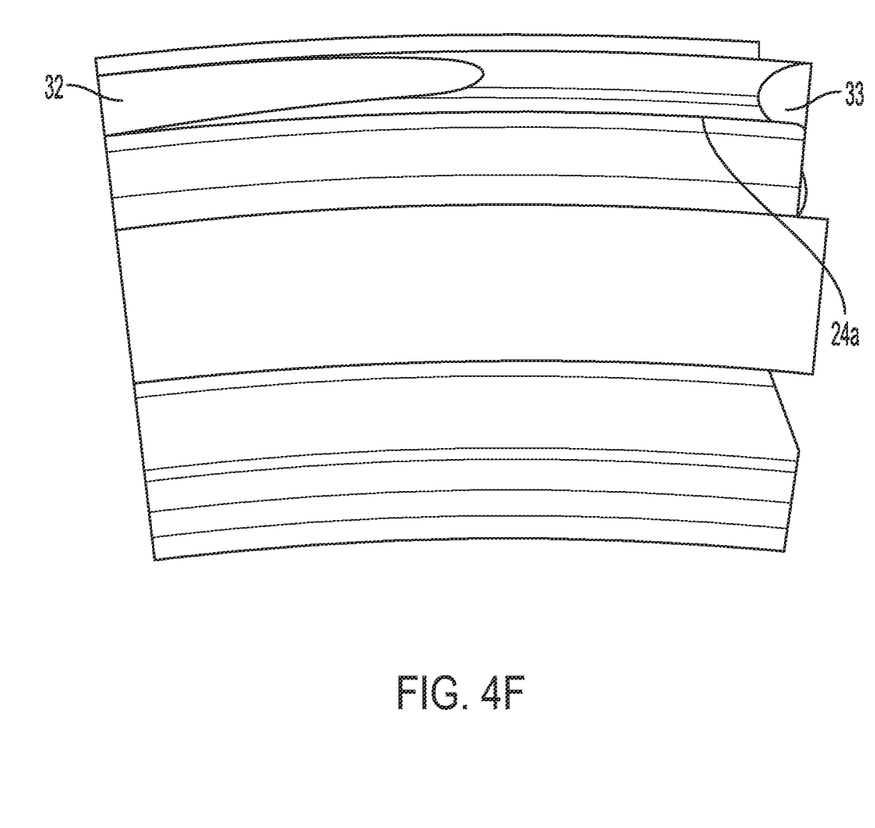
FIG. 4F is a front planar view of the snap flange of FIGS. 4A-4E.

As shown in FIG. 4B, an overlap (D) extent is defined between the snap nose 24 and the retention pocket 42. In general, this overlap (D) must be sufficiently high or large to ensure that the two parts remain connected to each other. However, this overlap (D) must also be limited to ensure that the neck 21 or any other region of the snap flange 22 is not damaged during installation. If the overlap (D) is too large, then the neck 21 can deform or fracture. This can result in the part being unsuitable for use, or cause premature failure.

Figure 5A:
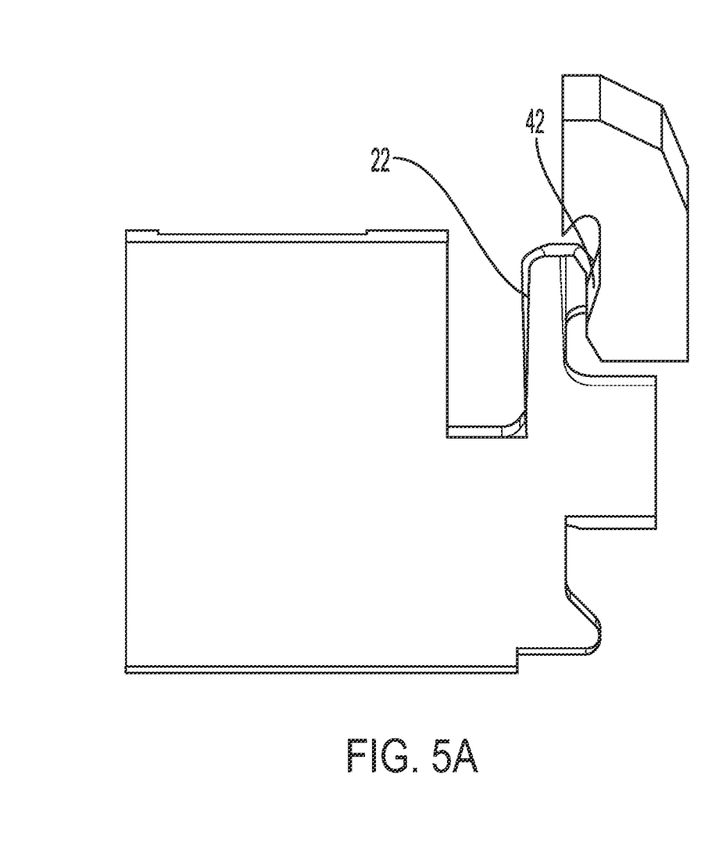
FIGS. 5A-5D illustrate a side view of an engagement sequence between the retention pocket and the snap flange.
Figure 5B:
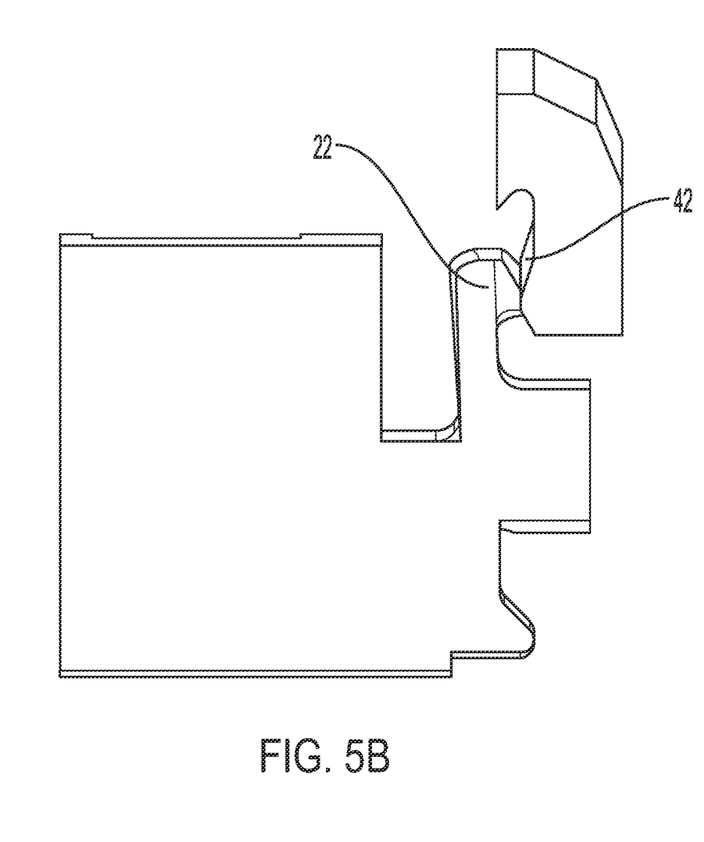
Figure 5C:
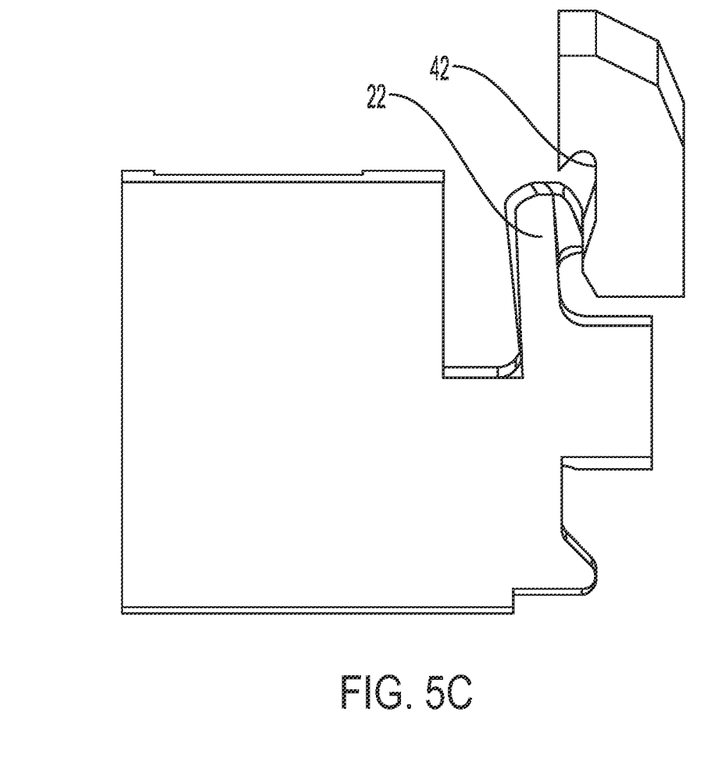
Figure 5D:
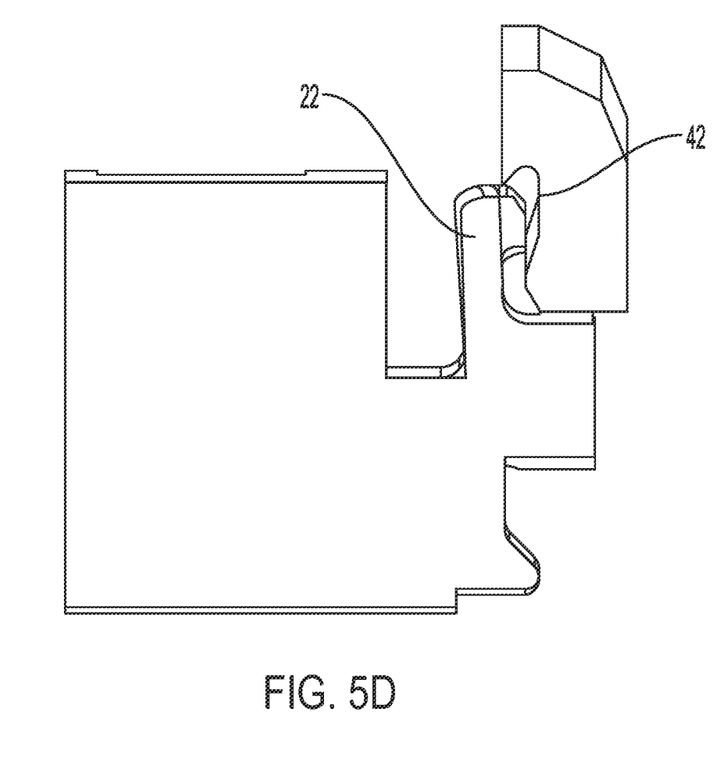
Figure 6A:
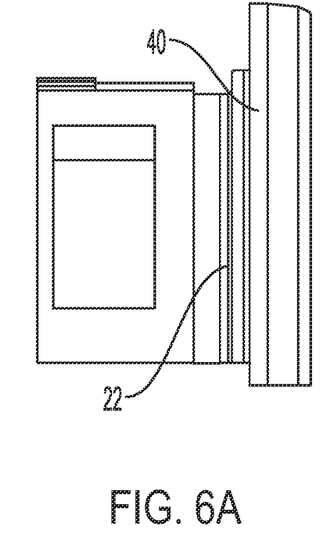
FIGS. 6A-6D illustrate a top view of the engagement sequence between the retention pocket and the snap flange.
Figure 6B:
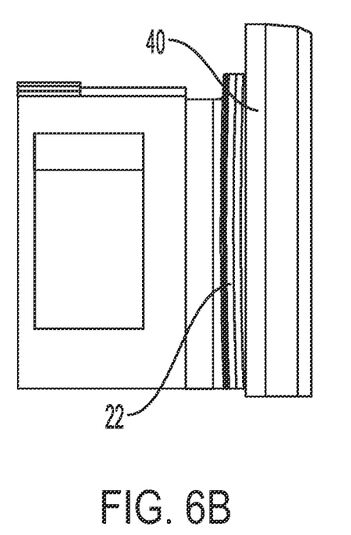
Figure 6C:
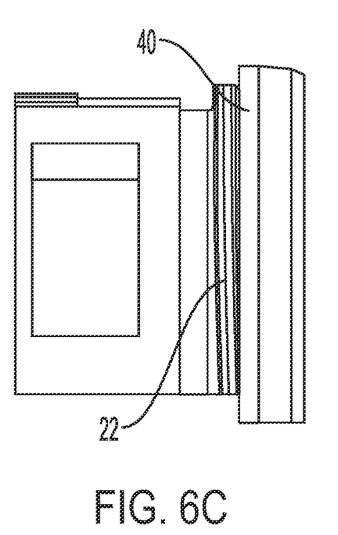
Figure 6D:
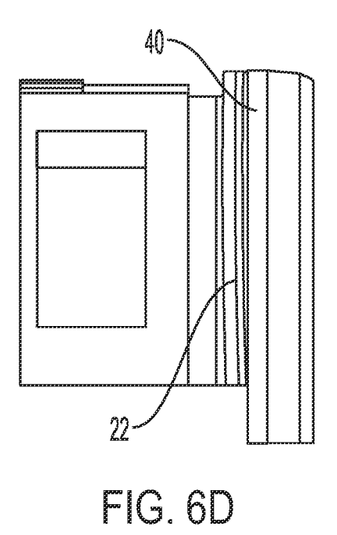

FIGS. 5A-5D and FIGS. 6A-6D are provided to show the engagement between the first and second components during assembly or attachment. FIGS. 5A and 6A correspond to the same moment during the assembly, FIGS. 5B and 6B correspond to the same moment during the assembly, FIGS. 5C and 6C correspond to the same moment during the assembly, and FIGS. 5D and 6D correspond to the same moment during the assembly. As shown in FIGS. 5A and 6A, the snap flange 22 is generally in a non-deflected state as engagement with the bearing ring 40 begins. Slight deformation of the snap flange 22 begins to show in FIGS. 5B and 6B. Additional deformation of the snap flange 22 is shown in FIGS. 5C and 6C. This deformation is generally less than or reduced as compared to known snap flange arrangements which do not include a relief or modified nose profile. Finally, FIGS. 5D and 6D show the snap flange 22 in a final position relative to the retention pocket 42.

In one aspect, the bearing ring 40 is formed from metal, and the cage 20 is formed from a plastic material. In this aspect, the bearing ring 40 is a more rigid component than the cage 20. One of ordinary skill in the art would understand that the exact materials used to form the bearing ring 40 and the cage 20 can vary.

A method of designing or determining an optimal snap element, such as a snap nose 24, is disclosed. As used in this context, the term optimal refers to a design that minimizes stresses on portions of a snapping element or component that are most prone to breaking or cracking during assembly, such as the neck 21.

In one aspect, the method includes iteratively determining a point of contact between two snap components, such as a snap nose 24 on a softer element and a retention pocket 42 on a more rigid element. The method can include establishing or determining a first or initial contact point (A) of the snap nose 24 with the retention pocket 42. The method then includes establishing or determining a second contact point (B) between the snap nose 24 and the retention pocket 42 based on intersection of the retention pocket 42 with a top portion, i.e. top round region 26, of the snap nose 24 during assembly. During this step, engagement between the two components can be established such that retention pocket 42 does not contact the snap nose 24 below a snap relief or top round (i.e. transition region 28) of the snap nose 24, and the retention pocket 42 does not overlap with a retention face region, i.e. element 30. In one aspect, this step ensures that the two components are not pressed too hard or deep relative to each other.

Next, the method includes establishing or identifying a third or final contact point (C) between the snap nose 24 and the retention pocket 42. This contact point is established such that when the more rigid component is engaged with the snap nose 24, the final contact point (C) corresponds to a farthest overlapping point of the more rigid component (i.e. retention pocket 42) and the top round region 26 of the snap nose 24. In one aspect, material is then iteratively removed from a face of the snap nose 24 to reflect the general area defined between contact points (A, B, C).

In one aspect, an optimal geometry of the snap nose 24 can be determined through iteration by analyzing the pressure on the snap nose 24 during assembly to determine where nose material removal may help reduce stress in the neck 21. Once this stress is established and mapped, the snap nose 24 geometry can be modified in order to lessen the stress on the snap nose 24, and more specifically on the neck 21 of the snap nose 24.

In one aspect, the profile of the relief disclosed herein is determined via analysis of stresses that develop in a non-modified snap flange (i.e. a snap flange without a relief). Based on this analysis, it can be determined where the exact loads or stresses are concentrated. As a result, the snap flange can be modified by removing material, forming a chamfered surface, or any other type of relief or void of material in order to modify the geometry of the snap flange as it engages with a retention pocket. In this way, the stresses associated with any particular snap flange can be addressed, and the relief on the snap flange can be specially shaped or formed to address the stresses or loads associated with a particular application or assembly.

The concepts and designs disclosed herein can be adapted for any type of mating or snap-type configuration in which two components are attached to each other and are formed from materials having a non-identical stiffness.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Assembly 10
First component/Cage 20

Neck 21
Snap flange 22
Snap nose 24
Contact face 24*a*
Top round region 26
Tip 27
Transition region 28
Retention face region 30
Relief 32
Relief 33
Second component/Bearing ring 40
Retention pocket 42

What is claimed is:

1. A multi-component snap assembly comprising:
a bearing cage first component including a snap flange having a snap nose with a contact face including a relief and a retention face coextensive with the contact face; and
a bearing ring second component including a retention pocket configured to engage with the contact face during insertion of the second component relative to the first component;
wherein the relief has a parabolic profile that extends in a circumferential direction or the relief extends from a first circumferential end of the snap flange, and a secondary relief is defined on a second, opposite circumferential end of the snap flange.

2. The assembly according to claim 1, wherein the bearing ring is formed from metal and the bearing cage is formed from plastic.

3. The assembly according to claim 1, wherein at least three distinct contact points are defined between the snap nose and the retention pocket during insertion of the second component relative to the first component.

4. The assembly according to claim 3, wherein a first contact point is defined on a radially outer region of the snap flange, a second contact point is defined on a radially inner region of the snap flange, and a third contact point is defined circumferentially away from the first and second contact points.

5. The assembly according to claim 1, wherein the second component is inserted in a predominantly radially inward direction for engagement with the first component.

6. The assembly according to claim 1, wherein the relief on the snap nose defines an asymmetrical profile for the contact face.

7. The assembly according to claim 1, wherein the relief has a circumferential extent that is at least 50% of a total circumferential extent of the snap flange.

8. The assembly according to claim 1, wherein in areas away from the relief, the snap flange includes a tip, a top round region adjacent to the tip, a transition region adjacent to the top round region, and a retention face region adjacent to the transition region.

9. The assembly according to claim 8, wherein, in a circumferential direction, the top round region has a curved profile, the transition region has a slanted profile, and the retention face region has a flat profile.

10. A method of attaching a first component with a second component, the method comprising:
providing:
a bearing cage as the first component including a snap flange with a snap nose having a contact face with a relief and a retention face coextensive with the contact face; and
a bearing ring as the second component including a retention pocket;
pressing the second component relative to the first component such that the contact face engages the retention pocket to secure the first component to the second component;
wherein the relief has a parabolic profile that extends in a circumferential direction or the relief extends from a first circumferential end of the snap flange, and a secondary relief is defined on a second, opposite circumferential end of the snap flange.

11. The method according to claim 10, wherein the contact face has an asymmetrical profile.

12. The method according to claim 10, wherein the relief has a circumferential extent that is at least 50% of a total circumferential extent of the snap flange.

13. The method according to claim 10, wherein at least three distinct contact points are defined between the snap nose and the retention pocket during engagement between the contact face and the retention pocket.

14. The method according to claim 13, wherein a first contact point is defined on a radially outer region of the snap flange, a second contact point is defined on a radially inner region of the snap flange, and a third contact point is defined circumferentially away from the first and second contact points.

15. A method of attaching a first component with a second component, the method comprising:
providing:
a bearing cage as the first component including a snap flange with a snap nose having a contact face with a relief and a retention face coextensive with the contact face; and
a bearing ring as the second component including a retention pocket;
pressing the second component relative to the first component such that the contact face engages the retention pocket to secure the first component to the second component, wherein in areas away from the relief, the snap flange includes a tip, a top round region adjacent to the tip, a transition region adjacent to the top round region, and a retention face region adjacent to the transition region, and in a circumferential direction, the top round region has a curved profile, the transition region has a slanted profile, and the retention face region has a flat profile.

* * * * *